United States Patent
Clark et al.

(10) Patent No.: US 9,194,335 B2
(45) Date of Patent: Nov. 24, 2015

(54) ROCKET ENGINE COOLANT SYSTEM INCLUDING AN EXIT MANIFOLD HAVING AT LEAST ONE FLOW GUIDE WITHIN THE MANIFOLD

(75) Inventors: James A. Clark, Jupiter, FL (US); Charles W. Whipple, Okeechobee, FL (US)

(73) Assignee: AEROJET ROCKETDYNE OF DE, INC., Canoga Park, CA (US)

( * ) Notice: Subject to any disclaimer, the term of this patent is extended or adjusted under 35 U.S.C. 154(b) by 868 days.

(21) Appl. No.: 13/416,440

(22) Filed: Mar. 9, 2012

(65) Prior Publication Data

US 2013/0232950 A1    Sep. 12, 2013

(51) Int. Cl.
| | | |
|---|---|---|
| F02K 9/64 | (2006.01) | |
| F02K 9/97 | (2006.01) | |
| F02K 9/42 | (2006.01) | |
| F02K 9/62 | (2006.01) | |

(52) U.S. Cl.
CPC . *F02K 9/64* (2013.01); *F02K 9/972* (2013.01); *F02K 9/42* (2013.01); *F02K 9/62* (2013.01); *F02K 9/97* (2013.01)

(58) Field of Classification Search
CPC ............... F02K 9/60; F02K 9/64; F02K 9/40; F02K 9/972; F02K 9/97; F02K 1/822; F02K 9/52; F02K 9/62; F02K 9/42; F15D 1/08; F15D 1/14; F15D 1/0005; F15D 1/0095; F23R 3/005; F16L 9/18; F16L 9/19; F04F 5/00
USPC ............. 60/267; 137/602, 605, 113; 239/468, 239/472; 138/114, 148
See application file for complete search history.

(56) References Cited

U.S. PATENT DOCUMENTS

| | | | | |
|---|---|---|---|---|
| 3,001,726 | A * | 9/1961 | Hasbrouck | 239/468 |
| 3,062,566 | A * | 11/1962 | Coburn | 60/266 |
| 3,093,963 | A * | 6/1963 | York, Jr. et al. | 60/260 |
| 5,052,348 | A * | 10/1991 | Takakura | F01P 3/02 123/41.55 |
| 5,557,928 | A | 9/1996 | Castro et al. | |
| 5,619,851 | A | 4/1997 | Johnson et al. | |
| 6,164,075 | A * | 12/2000 | Igarashi | F23R 3/005 60/752 |
| 6,173,561 | B1 * | 1/2001 | Sato | F02C 7/18 60/752 |
| 6,298,659 | B1 * | 10/2001 | Knuth | F02K 9/52 60/258 |
| 6,601,380 | B2 * | 8/2003 | Knuth | F02K 9/52 60/219 |
| 7,373,774 | B2 * | 5/2008 | Clark | F02K 9/64 60/267 |
| 7,641,865 | B2 | 1/2010 | Tonkovich et al. | |
| 2010/0300067 | A1 * | 12/2010 | Boman | 60/267 |

* cited by examiner

*Primary Examiner* — William H Rodriguez
*Assistant Examiner* — Alain Chau
(74) *Attorney, Agent, or Firm* — Joel G Landau

(57) ABSTRACT

An exit manifold is disclosed which includes a manifold body that includes a plurality of inlets. The manifold body provides communication between the inlets and a discharge port. At least one of the inlets directs flow in a first direction and at least one of the inlets directs flow in a second direction. The first and second directions are opposite and the material flowing in these opposite directions collides in front of the discharge outlet. The collision of these two oppositely-directed flows creates a high pressure stagnation region that may block or impede flow from one or more inlets that may be in alignment with the discharge port.

2 Claims, 4 Drawing Sheets

ROCKET ENGINE COOLANT SYSTEM INCLUDING AN EXIT MANIFOLD HAVING AT LEAST ONE FLOW GUIDE WITHIN THE MANIFOLD

TECHNICAL FIELD

An exit manifold is disclosed that reduces a high pressure stagnation region that occurs when two or more flows entering the exit manifold from different inlets collide when the flows approach a common outlet from different directions. Because a high pressure stagnation region reduces flow through the inlets to the common outlet, the disclosed exit manifold provides improved flow rates through the manifold and reduced pumping pressures.

DESCRIPTION OF THE RELATED ART

One example of a rocket engine is the RL10 rocket engine manufactured by Pratt & Whitney, owned by the assignee of this application. Three major components of this engine are a turbopump, a combustion chamber and an exhaust nozzle.

During operation of the rocket engine, the turbopump is used to supply a fuel and oxidant, such as liquid hydrogen and liquid oxygen, to the combustion chamber. The liquid oxygen and liquid hydrogen are expanded in the combustion chamber and burned to produce hot, pressurized rocket gases. The hot, pressurized gases flow at high velocities to the exhaust nozzle. The exhaust nozzle allows further expansion of the gases to increase the velocity of the gases before the gases exit the engine, thereby increasing the thrust of the rocket engine.

The exhaust nozzle is fabricated from thin walled tubes that are tapered and shaped to form a nozzle contour. Liquid hydrogen fuel flows through these tubes to provide convective cooling to the tubes and regenerative heating to the hydrogen fuel. The convective cooling ensures that the temperature of the tubes is within the temperature limits required for structural integrity of the nozzle.

In a typical rocket engine, coolant may also flow through a plurality of tubes or passages that form the cylindrical wall of the combustion chamber. The coolant may be discharged at relatively high velocity into a toroidal coolant exit manifold, which typically has a single discharge port. Flow through individual tubes or passages is influenced by pressures in the exit manifold. Since uniform flow through all of the tubes or passages is desirable, pressures in the exit manifold should be as uniform as possible.

Typical rocket engine applications require that overall coolant pressure loss be minimized so that engine performance can be optimized. The higher the coolant pressure loss, the higher the pumping pressure required to push the coolant through the engine. To help minimize overall coolant pressure loss, the pressure losses associated with the coolant-collection or exit manifold should be minimized.

In current rockets, coolant from the individual tubes or passages enters a toroidal exit manifold either radially or axially. Once the coolant enters the exit manifold, it turns ninety degrees and flows circumferentially toward the discharge port of the exit manifold. Curved guides or vanes may be used to reduce the pressure within the exit manifold and reduce the pumping pressure required to push the coolant through the exit manifold. However, a group of about half of the inlets and optional vanes direct the coolant in a clockwise direction and another group of about half of the inlets and optional vanes direct coolant in the counter-clockwise direction with the opposing flows colliding in front of the discharge port of the exit manifold or 180° from the discharge port. This collision creates a high pressure stagnation region that contributes to reduced flow through the coolant tubes or passages, the inlets and the discharge port thereby requiring increased pumping pressure to meet the flow requirements.

SUMMARY OF THE DISCLOSURE

A manifold is disclosed that includes a discharge port having an axis. The manifold also includes a plurality of inlets causing a flow in at least one first direction not parallel to the axis of the discharge port. The manifold also includes a feature disposed within the manifold and not parallel to the at least one first direction of flow. As a result, the feature is configured to change the at least one first direction of the flow towards the axis of the discharge port.

An exit manifold is disclosed which includes a manifold body that includes a plurality of inlets. The manifold body provides communication between the inlets and a discharge port. The inlets include at least one inlet directing flow in a first direction and towards the discharge port and at least one inlet directing flow in a second direction and towards the discharge port. The second direction is opposite the first direction which results in a collision of the flows traveling in the first and second directions. This collision typically takes place in front of the discharge port or 180° from the discharge port. The inlets also include at least one inlet disposed in alignment with the discharge port and directing flow in a third direction that is at least substantially parallel to the axis of the discharge port. The exit manifold further includes at least one flow guide in communication with the at least one inlet disposed in alignment with the discharge port. The at least one flow guide extends from the at least one inlet disposed in alignment with the discharge port and partially across the manifold body before terminating before reaching the discharge port.

A system for cooling a combustion chamber of an engine is also disclosed. The system includes a plurality of coolant tubes or passages surrounding the combustion chamber. The system further includes an exit manifold including a manifold body including a plurality of inlets. Each inlet is in communication with one of the tubes or passages and the inlets are spaced apart along the manifold body. The manifold body is in communication with a discharge port. The inlets include a first group of inlets directing flow in a first direction towards the discharge port. The inlets also include a second group of inlets directing coolant flow in a second direction and towards the discharge port. The second direction is opposite the first direction. The inlets further include a third group of inlets disposed in alignment with the discharge port and directing coolant flow in a third direction that is at least substantially parallel to the axis of the discharge port. Further, the exit manifold further includes at least one flow guide in communication with the third group of inlets. The at least one flow guide extends from the third group of inlets and partially across the manifold body before terminating before reaching the discharge port.

A combustion chamber of an engine is also disclosed. The combustion chamber includes a chamber body and a plurality of coolant tubes or passages surrounding the chamber body. The combustion chamber also includes a toroidal exit manifold that includes a plurality of inlets spaced apart around an inner periphery of the exit manifold. Each inlet is in communication with one of the tubes or passages. Further, an outer periphery of the exit manifold is in communication with a discharge port. The inlets include a first group of inlets directing flow in a clockwise direction towards the discharge port and a second group of inlets directing flow in a counter-clockwise direction and towards the discharge port. The inlets further include a third group of inlets disposed at least in substantial alignment with the discharge port and directing coolant flow in a third direction that is at least substantially parallel to the axis of the discharge port. Further, the exit manifold further includes at least one flow guide in communication with the third group of inlets. The at least one flow guide extends from the inner periphery of the exit manifold and partially across the exit manifold before terminating before reaching the discharge port.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
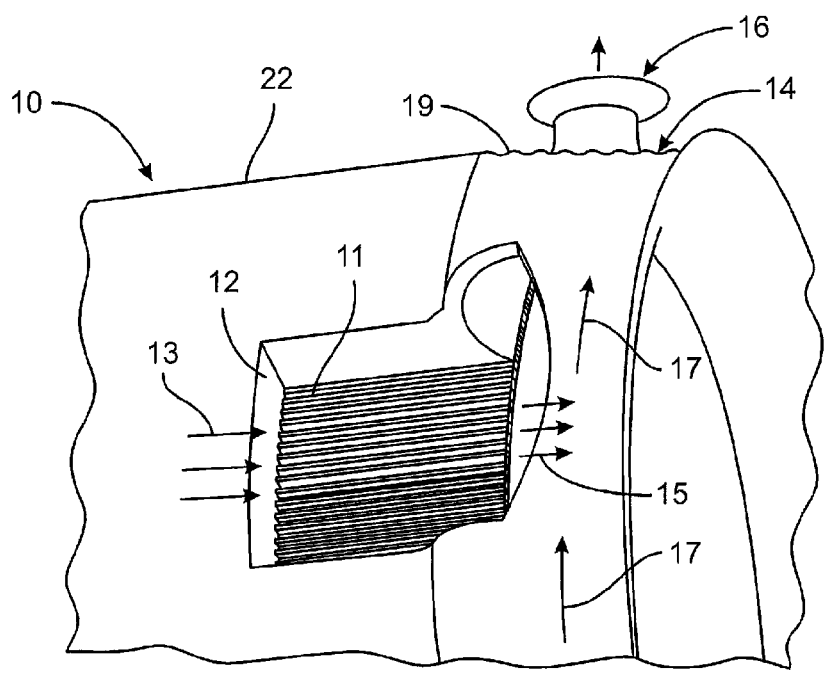
FIG. 1 is a partial sectional view of a conventional coolant-collection exit manifold for a rocket engine combustion chamber.
Figure 2:
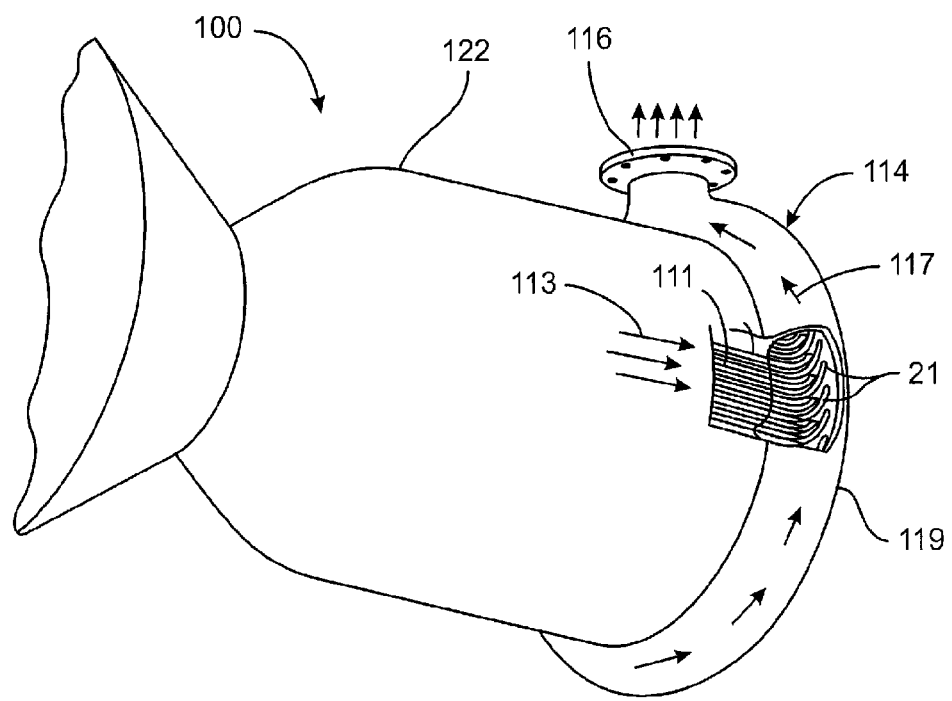
FIG. 2 illustrates yet another conventional coolant-collection exit manifold for a rocket engine combustion chamber.
Figure 3:
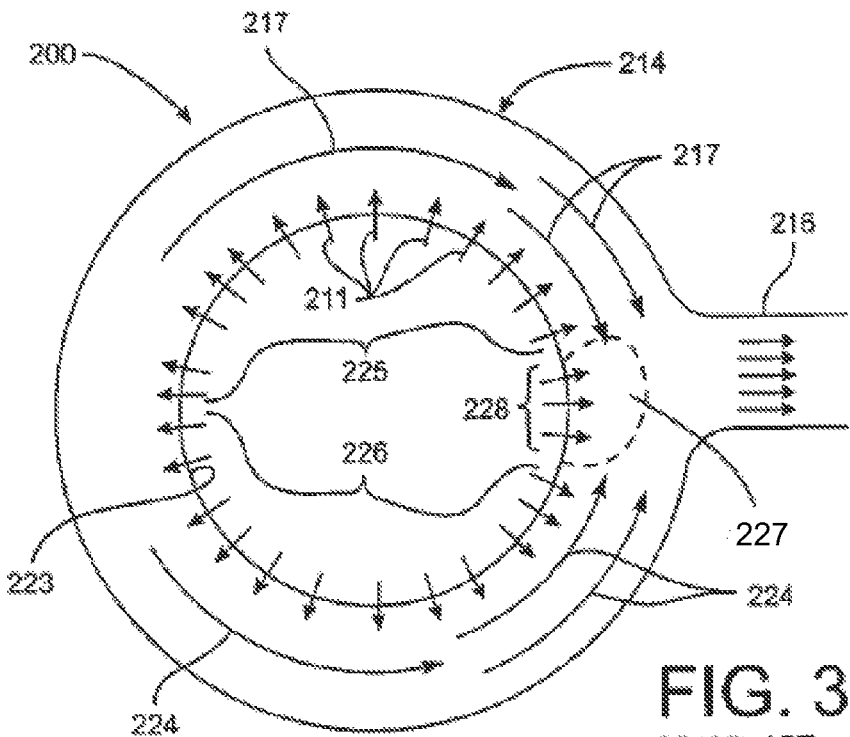
FIG. 3 is an end sectional view of yet another conventional coolant-collection exit manifold for a rocket engine combustion chamber.

An understanding of the problems solved and the advantages conveyed by the exit manifolds, coolant systems and combustion chambers disclosed herein requires a brief discussion of conventional combustion chambers and exit manifolds as shown in FIGS. 1-3.

Turning to FIG. 1, in the combustion chamber 10 of a typical rocket engine, coolant flows through a plurality of tubes or passages 11 that form a cylindrical wall 12 of the rocket combustion chamber 10. The coolant flows in the direction of the arrows 13 towards an exit manifold 14 that is toroidal in configuration. The coolant is discharged at a relatively high velocity into the manifold 14 as indicated by the arrows 15. Flow rates through the individual tubes or passages 11 is influenced by pressures in the exit manifold 14. Since uniform flow through all of the tubes or passages 11 is desirable, pressures in the exit manifold should also be as uniform as possible.

Further, typical rocket engine applications require that the overall coolant pressure loss be minimized so that engine performance can be optimized. The higher the coolant pressure loss, the higher the pumping pressure required to push the coolant through the engine. To help minimize overall coolant pressure loss, the pressure loss is associated with the exit manifold 14 should be minimized.

However, in the current combustion chamber 10 as shown in FIG. 1, coolant from the individual tubes or passages 11 discharges radially or axially into the exit manifold 14 as indicated by the arrows 15. The coolant must then turn 90° and flow circumferentially towards the manifold discharge port 16 as indicated by the arrows 17. This abrupt and uncontrolled turn may be a source of significant pressure loss in the exit manifold 14. To alleviate this problem, the combustion chamber 100 of FIG. 2 was developed and disclosed in U.S. Pat. No. 7,373,774, assigned to the assignee of the present application. The combustion chamber 100 includes a plurality of tubes or passages 111 that flow in the direction 113 into the exit manifold 114. To alleviate the pressure loss caused by the 90° turn required by the exit manifold 14 of FIG. 1, a plurality of curved vanes 21 are employed to turn the coolant flow from a radial or axial direction to a circumferential direction 117 as shown in FIG. 2. The combustion chamber 100 includes a single discharge port 116 that is in communication with or coupled to the exit manifold 114.

Figure 5:
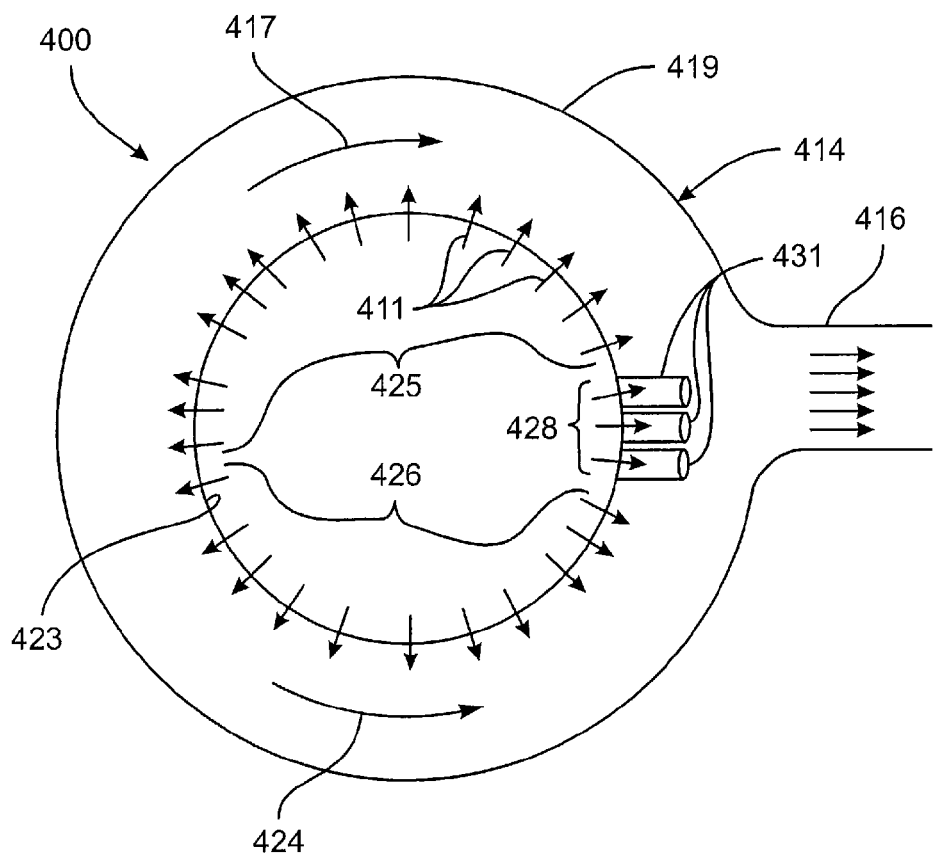
FIG. 5 is an end sectional view of another disclosed coolant-collection exit manifold for a rocket engine combustion chamber.
Figure 6:
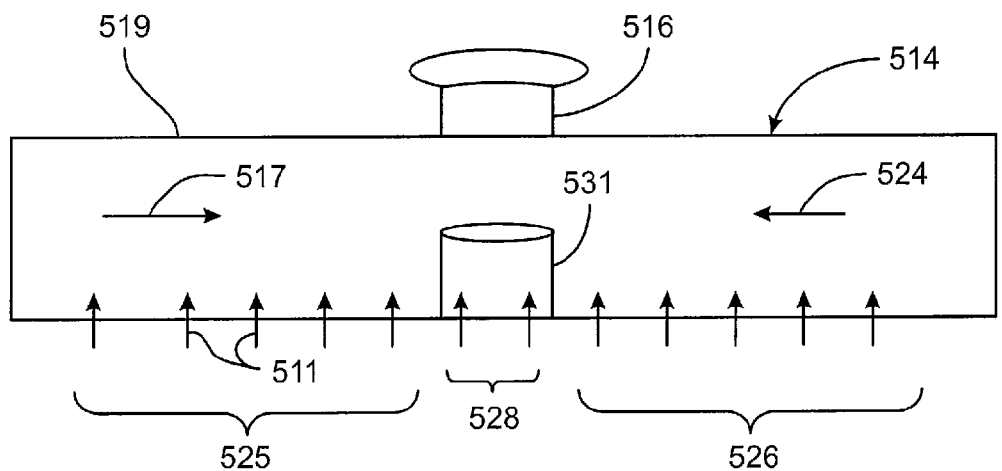
FIG. 6 is an end sectional view of a linear exit manifold made in accordance with this disclosure.

Referring to both FIGS. 1 and 2, each combustion chamber 10, 100, includes a body 22, 122 respectively that may be coupled to or connected to their respective exit manifolds 14, 114 respectively. The exit manifolds 14, 114 also include a body 19, 119 that, as stated above, may be toroidal or ring-shaped. While toroidal exit manifolds are disclosed herein as examples, it will be noted that the advantages and benefits of the disclosed exit manifold 314 shown in FIG. 4 also apply to non-toroidal manifolds as will be explained below in connection with FIG. 6. Further, in addition to non-toroidal manifold as disclosed in FIG. 6, this disclosure also encompasses manifolds that produce only one primary direction of flow such as 217 or 224 (FIG. 3), 317 or 324 (FIG. 4), 417 or 424 (FIG. 5) and 517 or 524 (FIG. 6).

Turning to FIG. 3, an end sectional view of yet another conventional combustion chamber 200 is shown, particularly illustrating the exit manifold 214. A plurality of tubes or passages are shown schematically at 211. The tubes or passages 211 may be arranged to provide radial flow into the exit manifold 214. However, because the inlets 211 are disposed along an inner periphery 223 of the manifold 214, some of the coolant flows in the clockwise direction indicated by the arrows 217 while some of the coolant flows in the counter-clockwise direction indicated by the arrows 224. Thus, a first group of inlets 225 result in coolant flow in the direction 217 and a second group of inlets 226 direct coolant flow in the direction 224. The collision of these two oppositely-directed flows 217, 224 meet at a high pressure stagnation region 227. This high pressure stagnation region 227 is disposed in front of a third group of inlets 228 that are disposed in front of or axially aligned with the discharge port 216. The high pressure stagnation region 227 caused by the collision of the flows 217, 224 inhibits flow through the inlets 228 and thereby reduces the overall flow rate through the exit manifold 214 and increases the pumping pressure required to meet the desired flow rate.

Figure 4:
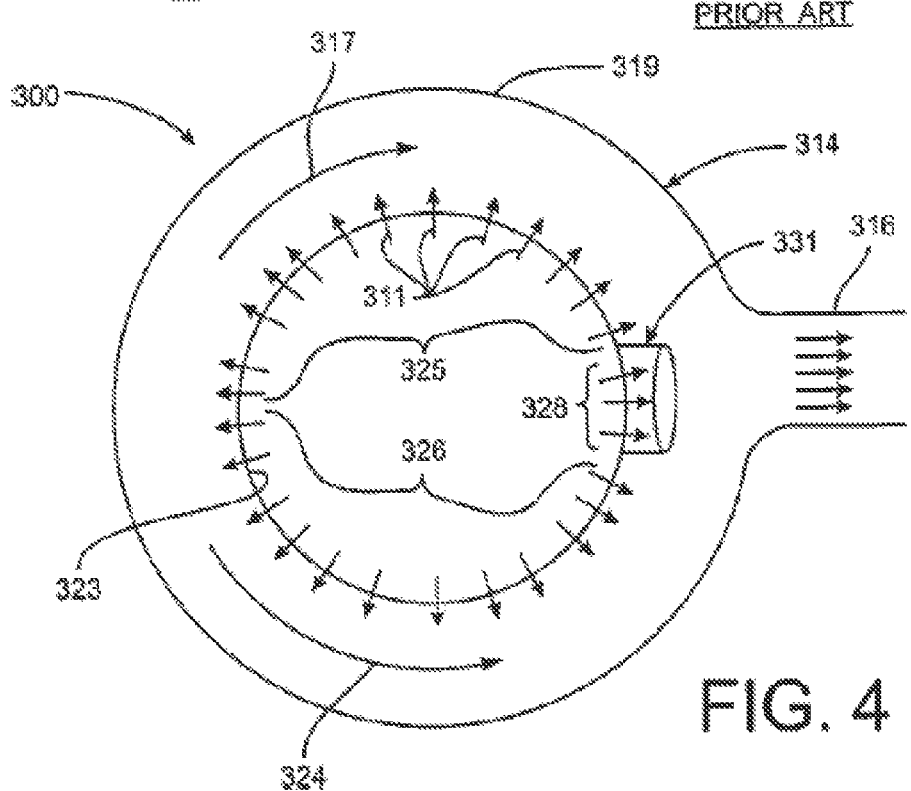
FIG. 4 is an end sectional view of a disclosed coolant-collection exit manifold for a rocket engine combustion chamber.

One solution to this problem is provided by the combustion chamber 300 illustrated in FIG. 4. The combustion chamber 300 is coupled to an exit manifold 314 that also includes a plurality of inlet tubes or passages 311 disposed about the inner periphery 323 of the manifold body 319. The inlet tubes or passages 311 may also be divided into three groups, including a first group 325 that directs flow in the circumferential direction 317, a second group of inlet tubes or passages 326 that may direct flow in the circumferential direction 324. However, instead of these clockwise and counter-clockwise flows 317, 324 colliding at the discharge port 316, and creating a high pressure stagnation region 226 (see FIG. 3), a flow guide 331 is provided that may surround the third group of inlet tubes or passages 328. By providing the flow guide 331, coolant may flow through the inlet tubes or passages 328 and through the flow guide 331 directly to the discharge outlet 316 without having to pass through a high pressure stagnation region 226 as shown in FIG. 3. Thus, flow through the third group of inlet tubes or passages 328 is improved and overall flow through the exit manifold 314 is optimized.

However, instead of these clockwise and counter-clockwise flows 317, 324 colliding at the discharge port 316, and creating a high pressure stagnation region 227 (see FIG. 3), a flow guide 331 is provided that may surround the third group of inlet tubes or passages 328. By providing the flow guide 331, coolant may flow through the inlet tubes or passages 328 and through the flow guide 331 directly to the discharge outlet 316 without having to pass through a high pressure stagnation region 227 as shown in FIG. 3. Thus, flow through the third group of inlet tubes or passages 328 is improved and overall flow through the exit manifold 314 is optimized.

The flow guide 331 as shown in FIG. 4 is tubular in form. However, the flow guide 331 may be a plurality of tubes that serve as extensions for the inlet tubes or passages 328. For example, FIG. 5 illustrates an exit manifold 414 whereby the third group of inlets 428 include tubular extensions 431 that enable flow through the third group of inlets 428 without having to pass through a high pressure stagnation region 227 as illustrated in FIG. 3. The design of the manifold body 419 and placement of the inlets 411 along the inner periphery 423 of the manifold body 419 is the same or similar to the configuration shown in FIGS. 3 and 4. Again, a single discharge port 416 is utilized.

The disclosed flow guide concept may also be employed in non-toroidal exit manifold configurations. Specifically, FIG. 6 illustrates an exit manifold 514 with a tubular body 519 (that may be linear or non-linear) and a plurality of inlets 511. The inlets 511 may be divided into three groups including a first group 525, that propels coolant flow in the direction of the arrow 517, a second group 526 that propels coolant in the direction of the arrow 524 and a third group of inlets 528 that are in general alignment with the discharge port 516. A flow guide 531 again prevents the creation of a high pressure stagnation region 226 as shown in FIG. 3. Further, the flow guide 531 may not be a singular tube as shown, but may be individual tubes or extensions to the third group of inlet tubes or passages 528, similar to the embodiment of FIG. 5.

Figure 7:
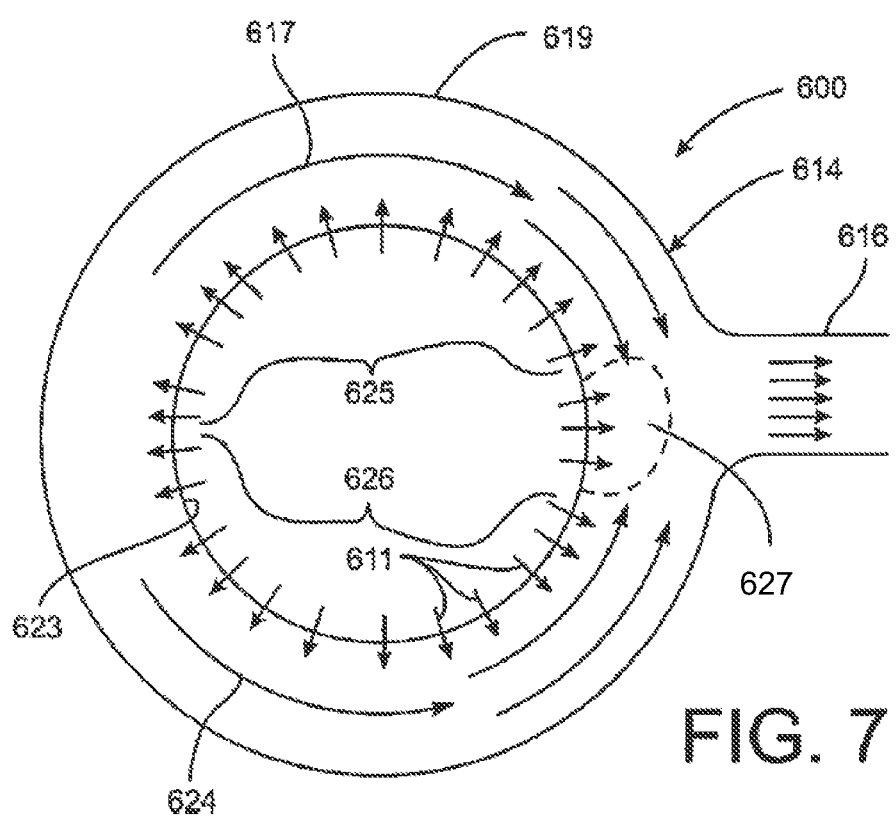
FIG. 7 is an end sectional view of yet another disclosed coolant-collection exit manifold for a rocket engine combustion chamber.

Finally, FIG. 7 illustrates yet another disclosed combustion chamber 600 with an exit manifold 614 having a toroidal body 619 with an inner periphery 623. A plurality of inlets 611 are disposed along the inner periphery 623 of the manifold body 619. Clockwise and counter-clockwise flows 617, 624 are generated thereby creating a high pressure stagnation region 626. However, neither group of inlets 625, 626 are in radial alignment with the high pressure stagnation region 626. Instead, the inlets disposed in axial alignment with the outlet 616 are displaced on either side of the high pressure stagnation region 626 or are spaced radially around the high pressure stagnation region 626. Thus, no inlet 611 directs flow into the high pressure stagnation region 626. To accommodate for the loss of inlets, in the high pressure stagnation region 626, inlets 611 can be spaced around the high pressure stagnation region 626 or additional inlets 611 may be added in the manifold body 629.

INDUSTRIAL APPLICABILITY

Finally, FIG. 7 illustrates yet another disclosed combustion chamber 600 with an exit manifold 614 having a toroidal body 619 with an inner periphery 623. A plurality of inlets 611 are disposed along the inner periphery 623 of the manifold body 619. Clockwise and counter-clockwise flows 617, 624 are generated thereby creating a high pressure stagnation region 627. However, neither group of inlets 625, 626 are in radial alignment with the high pressure stagnation region 627. Instead, the inlets disposed in axial alignment with the outlet 616 are displaced on either side of the high pressure stagnation region 627 or are spaced radially around the high pressure stagnation region 627. Thus, no inlet 611 directs flow into the high pressure stagnation region 627. To accommodate for the loss of inlets, in the high pressure stagnation region 627, inlets 611 can be spaced around the high pressure stagnation region 627 or additional inlets 611 may be added in the manifold body 629.

Thus, improved exit manifolds 314, 414, 514, 614 are disclosed that provide improved flow rates through the exit manifolds 314, 414, 514, 614. The improved flow may be provided by creating a flow guide 331, 431, 531 to protect the flow through the group of inlets 328, 428, 528 disposed in alignment with the discharge outlet 316, 416, 516. Further, the flow guide or feature which redirects flow towards the discharge port 316, 416, 516 and 616 may be provided in a variety of forms including, but not limited to ribs, slots, lanes, bumps, protrusions, baffles, etc. or any structure capable of redirecting fluid flow from one direction towards a second direction while contemporaneously minimizing pressure losses. Without the protection of such a flow guide 331, 431, 531, a high pressure stagnation region can be generated in the vicinity of the third group of inlet tubes or passages 328, 428, 528 thereby impeding the flow through these inlet tubes or passages 328, 428, 528 and thereby reducing the overall flow through the exit manifolds 314, 414, 514, 614. The improved flow may also be provided by not having inlets 611 disposed in alignment with the discharge port 616 thereby eliminating the need for a flow guide 626, but including additional inlets spaced radially around the high pressure stagnation region 627 or elsewhere on the manifold body 619. Thus, exit manifolds 314, 414, 514, 614 are provided with improved flow, reduced pressures and thereby reduced pumping requirements.

The invention claimed is:

1. An exit manifold of a rocket engine coolant system comprising:

a manifold body in fluid communication with the rocket engine coolant system, said manifold body including a plurality of inlets and providing communication of a flow of coolant from the rocket engine coolant system between the inlets and a discharge port of the manifold body;

the inlets including at least one inlet directing the flow of coolant in a first direction and towards the discharge port, at least one inlet directing the flow of coolant in a second direction and towards the discharge port, the second direction being opposite the first direction, the inlets also including a plurality of inlets disposed in alignment with the discharge port and directing the flow of coolant in a third direction that is at least substantially parallel to an axis of the discharge port; and the exit manifold further including at least one flow guide within the manifold body in communication with the plurality of inlets disposed in alignment with the discharge port, the at least one flow guide extending from the plurality of inlets disposed in alignment with the discharge port and partially across the interior of the manifold body before terminating before reaching the discharge port, wherein the flow guide is a tube and the plurality of inlets disposed in alignment with the discharge port are surrounded by the tube.

2. A system for cooling a rocket engine combustion chamber comprising:

a plurality of coolant tubes or passages carrying a coolant flow surrounding the rocket engine combustion chamber;

an exit manifold in communication with the plurality of coolant tubes or passages, the exit manifold including a manifold body including a plurality of inlets, each inlet being in communication with one of the tubes or passages and the inlets being spaced-apart along the manifold body, the manifold body being in communication with a discharge port of the exit manifold;

the inlets including a first group of inlets directing the coolant flow in a first direction and towards the discharge port, a second group of inlets directing the coolant flow in a second direction and towards the discharge port, the second direction being opposite the first direction;

the inlets further including a third group of inlets disposed in alignment with the discharge port and directing the coolant flow in a third direction that is at least substantially parallel to an axis of the discharge port; and the exit manifold further including at least one flow guide within the manifold body in communication with the third group of inlets, the at least one flow guide extending from the third group of inlets and partially across the interior of the manifold body before terminating before reaching the discharge port, wherein the flow guide is a tube that surrounds the third group of inlets.

\* \* \* \* \*